United States Patent [19]
Yoshida

[11] Patent Number: 6,063,131
[45] Date of Patent: May 16, 2000

[54] EMULATOR SYSTEM AND EMULATION METHOD

[75] Inventor: Munehiro Yoshida, Hyogo, Japan

[73] Assignees: Mitsubishi Denki Kabushiki Kaisha, Tokyo; Mitsubishi Electric Semiconductor Software Co., Ltd., Hyogo, both of Japan

[21] Appl. No.: 08/948,520

[22] Filed: Oct. 10, 1997

[30] Foreign Application Priority Data

Mar. 12, 1997 [JP] Japan ................................ 9-058044

[51] Int. Cl.[7] .................................................. G06F 9/455
[52] U.S. Cl. ............................... 703/23; 703/24; 703/25; 710/48
[58] Field of Search .................... 395/500.45, 500.46, 395/500.48, 500.49; 710/48, 51; 703/24, 25, 27, 28

[56] References Cited

U.S. PATENT DOCUMENTS

| | | | |
|---|---|---|---|
| 4,447,876 | 5/1984 | Moore | 395/500.47 |
| 5,388,060 | 2/1995 | Adams, Jr. et al. | 395/500.48 |
| 5,539,901 | 7/1996 | Ramirez | 395/500.49 |
| 5,548,794 | 8/1996 | Yishay et al. | 710/51 |
| 5,574,892 | 11/1996 | Christensen | 395/500.49 |
| 5,805,470 | 9/1998 | Averill | 395/500.48 |
| 5,870,541 | 2/1999 | Tamura | 714/47 |

FOREIGN PATENT DOCUMENTS 1180647 7/1989 Japan.

*Primary Examiner*—Kevin J. Teska
*Assistant Examiner*—Samuel Broda
*Attorney, Agent, or Firm*—Leydig, Voit & Mayer

[57] ABSTRACT

An emulator system solving a problem of conventional emulator systems by recognizing a task execution history. In conventional systems, it was necessary for a microcomputer to incorporate a specific task for storing in a memory an identification number and switching time of a task to be executed next in a program to be debugged. The novel emulator system includes a first detector for detecting a write cycle of a microcomputer in which the identification number of a task to be executed next is recorded. A second detector detects the start cycle and end cycle of an interrupt. A measurement memory stores the timing of the write cycle and the timing of the start cycle and end cycle of the interrupt.

20 Claims, 9 Drawing Sheets

EMULATOR SYSTEM AND EMULATION METHOD

BACKGROUND OF THE INVENTION

1. Field of the Invention

The present invention relates to an emulator system and emulation method for supporting program development of microcomputers.

2. Description of Related Art

FIG. 8 is a schematic view of a program development system employing a conventional emulator system. In this figure, the reference numeral 1 designates a host computer; 2 designates a target board on which a microcomputer 3 is mounted; 3 designates the microcomputer; 4 designates an emulator system for debugging a program under development during program development of the microcomputer 3; 4a designates a probe of the emulator system 4 connected to a socket 2a of the target board 2; and 5 designates a communication cable for connecting the emulator system 4 with the host computer 1.

FIG. 9 is a block diagram showing a conventional emulator system 4. In this figure, the reference numeral 6 designates a timer embedded in the microcomputer 3; 7 designates a communication interface circuit for controlling the communications between the host computer 1 and a monitor circuit 8; 8 designates the monitor circuit for receiving a program to be debugged from the host computer 1, and transfers it to an emulation memory 9; 9 designates the emulation memory for storing the program to be debugged and a task execution history; 9a designates a task execution history recording memory area for recording the task execution history; 10 designates an address bus; 11 designates a data bus; and 12 designates a bus for transmitting a status signal indicating the state of the microcomputer 3.

Next, the operation will be described.

To carry out debugging of the program of the microcomputer 3 mounted on the target board 2, a debugger (debugging support program) is started in the host computer 1.

The debugger, having been started, transmits the program (program linked with a real time OS) of the microcomputer 3, which is to be debugged, from the host computer 1 to the monitor circuit 8 through the communication interface circuit 7.

Receiving the program of the microcomputer 3 to be debugged from the host computer 1, the monitor circuit 8 transfers the program to the emulation memory 9.

Once the program of the microcomputer 3 to be debugged has been stored in the emulation memory 9, the monitor circuit 8 controls the microcomputer 3 in accordance with commands transmitted from the host computer 1. Then, the microcomputer 3 executes processing such as executing the program to be debugged stored in the emulation memory 9.

More specifically, since the program linked with the real time OS is complex and consists of multiple tasks (a set of modules called tasks managed module by module), the individual tasks are executed according to a schedule planned by the scheduler of the real time OS.

Thus, the scheduler of the real time OS sequentially determines the task to be executed next, in which case the microcomputer 3 stores the identification number of a task to be executed next in the task execution history recording memory area 9a in the emulation memory 9, using a task which is incorporated in the program to be debugged for storing in the task execution history recording memory area 9a the identification number of the task to be executed next.

When switched to the task to be executed next, the microcomputer 3 identifies the switch time by referring to the timer 6 embedded in the microcomputer 3, and stores the switch time of the task in the task execution history recording memory area 9a of the emulation memory 9 using a task which is incorporated in the program to be debugged for storing the task switch time in the task execution history recording memory area 9a.

Thus, program developers can recognize the history of task execution by referring to the recorded contents (the identification numbers of the next executed tasks and the task switch times) in the task execution history recording memory area 9a in the emulation memory 9 after the completion of the program to be debugged, thereby achieving the debugging of the program.

With the conventional emulator system configured as described above, the program to be debugged must be provided with a specific task for storing the identification number and the switch time of the task to be executed next the task execution history recording memory area 9a. Such a task, however, becomes unnecessary after debugging, and hence must be deleted from the debugged program after completing the debugging. The reason that the task for storing the identification number and the switch time must be deleted is if the debugged program incorporating that task is installed in the microcomputer 3, the overall performance of the program will be degraded. This presents a further problem in that the program actually installed in the microcomputer 3 differs from the debugged program.

In addition, since the timer 6 used only for debugging must be provided in the microcomputer 3 to identify the switch time of the task, a problem arises in that the timer 6 becomes a useless resource after the debugging.

Moreover, although the history of task execution can be identified after executing the program to be debugged, a means for identifying the history of task state transition is not provided. This presents a problem of hindering sufficient debugging from being achieved in some cases.

SUMMARY OF THE INVENTION

The present invention is implemented to solve the foregoing problems. It is therefore an object of the present invention to provide an emulator system and an emulation method which enables the program actually installed in the microcomputer to agree with the debugged program, and which can prevent the useless resource from occurring after the debugging.

Another object of the present invention is to provide an emulator system and an emulation method capable of identifying the history of task state transition.

According to the first aspect of the present invention, there is provided an emulator system comprising: recording means for recording task related information of a task when the task related information is written into an emulation memory by a microcomputer; write detection means for detecting, by monitoring a state of the microcomputer, a write cycle of the microcomputer, in which the task related information is recorded in the emulation memory; and event management means for having the recording means record a detection time of the write cycle detected by the write detection means.

Here, the task related information may be a status signal indicating a state of the task, the status signal being output from the microcomputer involved in the state transition of the task.

The task related information may an identification number of a task to be executed next, the identification number being output from the microcomputer involved in switching of a task to be executed.

The emulator system may further comprise interrupt detection means for detecting a start cycle and an end cycle of an interrupt processing of the microcomputer by monitoring a state of the microcomputer, wherein the event management means may have the recording means record a detection time of the start cycle and the end cycle of the interrupt processing detected by the interrupt detection means.

The task related information may include, in addition to the identification number of the task to be executed next, a status signal indicating a state of the task, the status signal being output from the microcomputer involved in the state transition of the task.

The emulator system may further comprise discrimination means for deciding a history of task execution and a history of interrupt processing with reference to contents recorded in the recording means.

The emulator system may further comprise discriminating means for deciding a history of task state transition with reference to contents recorded in the recording means.

The emulator system may further comprise measurement means for measuring a wait time of a task from its transition to executable state to actual execution with reference to contents recorded in the recording means.

According to a second aspect of the present invention, there is provide an emulation method comprising the steps of: recording task related information of a task, the task related information being output from a microcomputer; detecting, by monitoring a state of the microcomputer, a write cycle of the microcomputer, in which the task related information is recorded; and recording a detection time of the write cycle.

Here, the task related information may a status signal indicating a state of the task, the status signal being output from the microcomputer involved in the state transition of the task.

The task related information may be an identification number of a task to be executed next, the identification number being output from the microcomputer involved in switching of a task to be executed.

The emulation method may further comprise the steps of detecting a start cycle and an end cycle of an interrupt processing of the microcomputer by monitoring a state of the microcomputer, and recording a detection time of the start cycle and the end cycle of the interrupt processing.

The task related information may include, in addition to the identification number of the task to be executed next, a status signal indicating a state of the task, the status signal being output from the microcomputer involved in the state transition of the task.

The emulation method may further comprise the step of deciding a history of task execution and a history of interrupt processing with reference to identification numbers of tasks, detection times of write cycles, and start cycles and end cycles of interrupts, which have been recorded.

The emulation method may further comprise the step of deciding a history of task state transition with reference to recorded status signals of tasks and detection times of write cycles.

The emulation method may further comprise the step of measuring a wait time of a task from its transition to executable state to actual execution with reference to recorded status signals of tasks and detection times of write cycles.

DETAILED DESCRIPTION OF THE PREFERRED EMBODIMENTS

The invention will now be described with reference to the accompanying drawings.

EMBODIMENT 1

Figure 1:
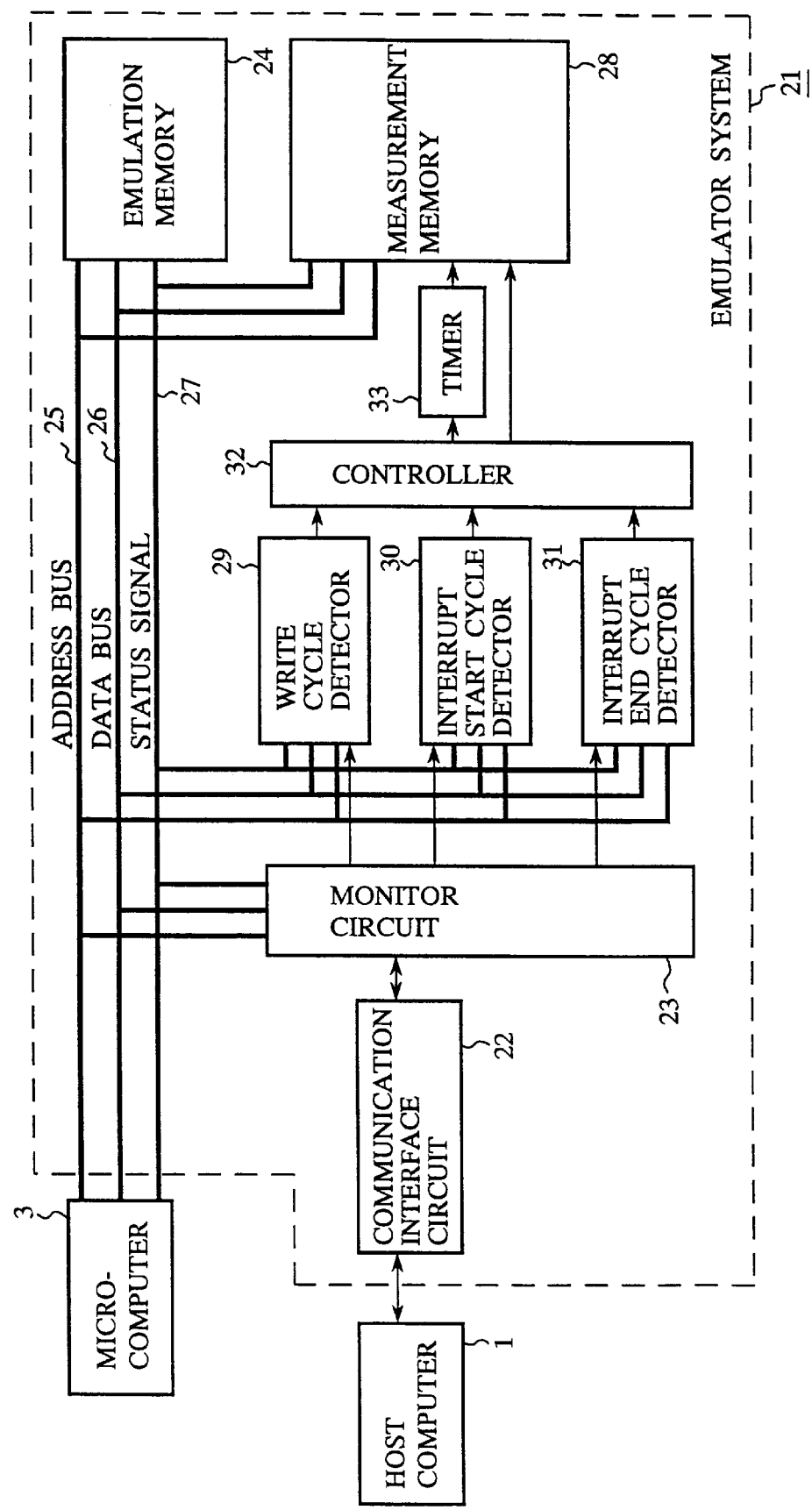
FIG. 1 is a block diagram showing embodiment 1 of an emulator system in accordance with the present invention.

FIG. 1 is a block diagram showing embodiment 1 of an emulator system in accordance with the present invention. In FIG. 1, the reference numeral 1 designates a host computer; 3 designates a microcomputer mounted on a target board; 21 designates an emulator system for debugging a program under development; 22 designates a communication interface circuit for controlling communication between the host computer 1 and a monitor circuit 23; 23 designates the monitor circuit for receiving the program to be debugged from the host computer 1, and for transferring it to an emulation memory 24; 24 designates the emulation memory for storing the program to be debugged; 25 designates an address bus; 26 designates a data bus; and 27 designates a bus for transmitting a status signal indicating the status of the microcomputer 3.

The reference numeral 28 designates a measurement memory (recording means) for recording an identification number of a task to be executed next when the identification number is written into the emulation memory 24 by the microcomputer 3 via the data bus 26 involved in switching an execution task; 29 designates a write cycle detector (write detection means) for detecting a write cycle of the microcomputer 3, in which the identification number is written in the emulation memory 24, by monitoring the state of the microcomputer 3; 30 designates an interrupt start cycle detector (interrupt detection means) for detecting the start cycle of processing of an interrupt by the microcomputer 3 and monitoring the state of the microcomputer 3; and 31 designates an interrupt end cycle detector (interrupt detection means) for detecting the end cycle of interrupt processing by the microcomputer 3 and monitoring the state of the microcomputer 3.

The reference numeral 32 designates a controller (event management means) for controlling the measurement memory 28 to store the write cycle (identification number), start cycle and end cycle themselves and the fact that they have been identified when they are detected by the detectors 29, 30 and 31, respectively; 33 designates a timer (event management means) for having the measurement memory 28 store detection times of the detectors 29, 30 and 31.

Figure 2:
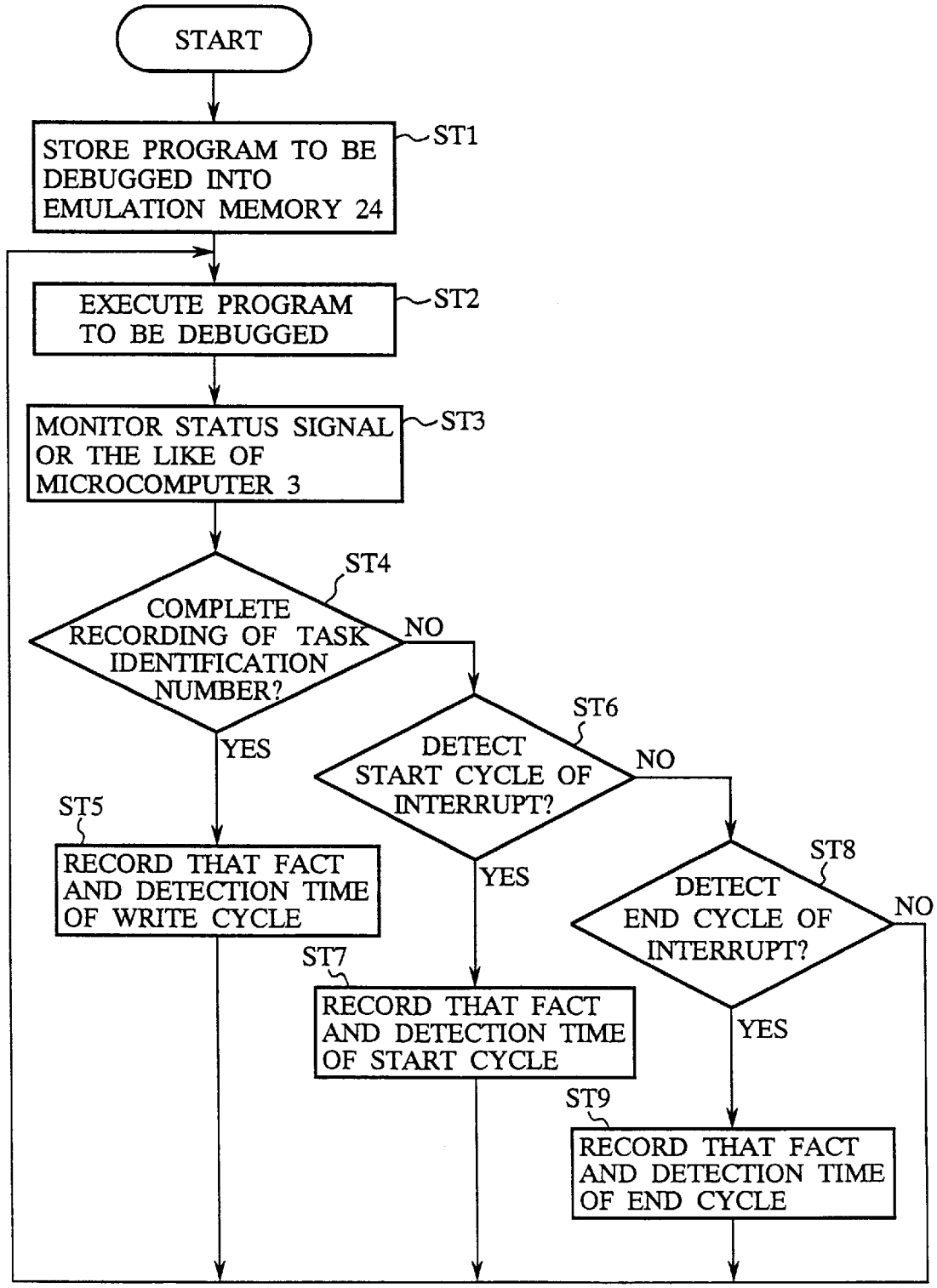
FIG. 2 is a flowchart illustrating an emulation method applied to embodiment 1 of the emulator system in accordance with the present invention.

FIG. 2 is a flowchart illustrating an emulation method applied to the embodiment 1 of the emulator system in accordance with the present invention.

Next, the operation will be described.

Figure 8:
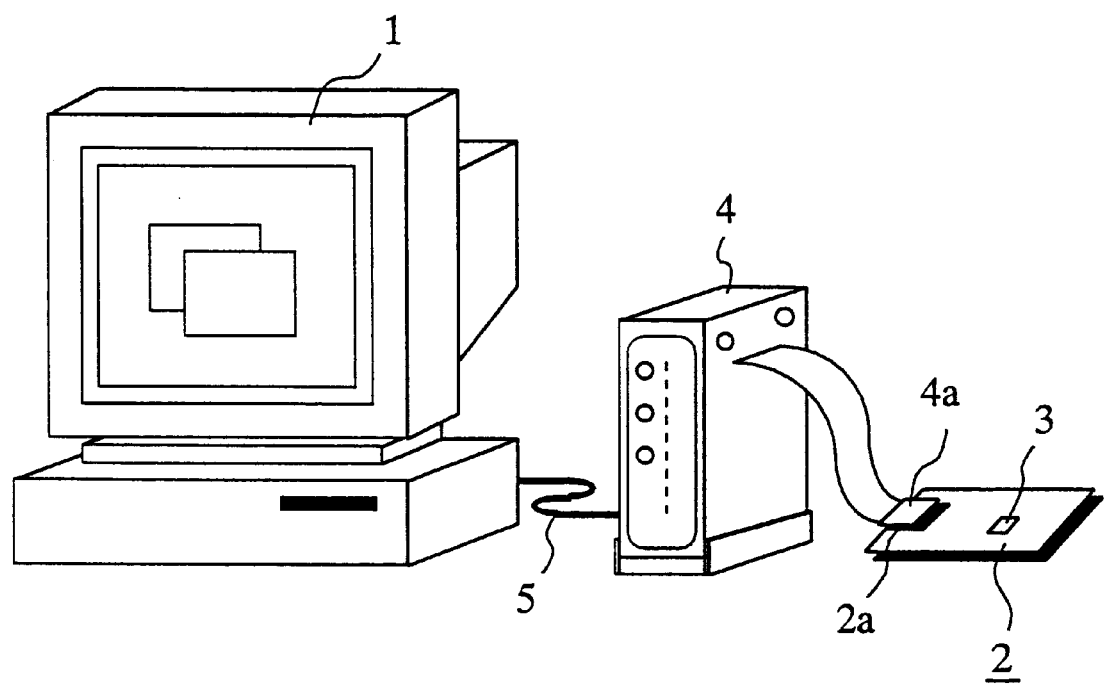
FIG. 8 is a schematic view showing a program development system using a conventional emulator system.
Figure 9:
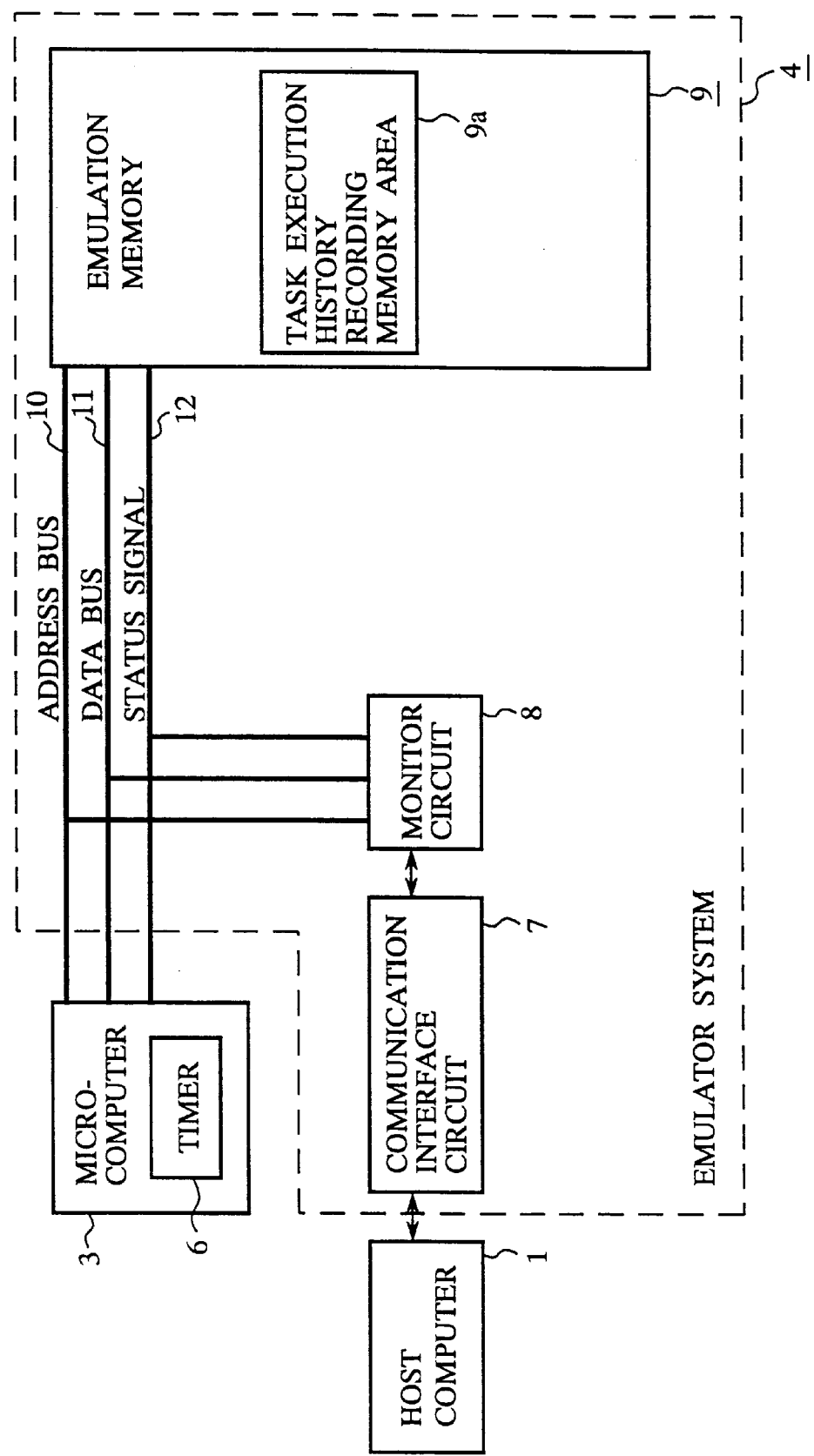
FIG. 9 is a block diagram showing the conventional emulator system.

First, when debugging a program of the microcomputer 3 mounted on target board 2 (see, FIG. 8), a debugger (program for supporting debugging) is started in the host computer 1.

When the debugger has been started, the host computer 1 transmits the program (program linked with a real time OS) of the microcomputer 3, which is to be debugged, to the monitor circuit 23 via the communication interface circuit 22.

After receiving the program of the microcomputer 3 to be debugged from the host computer 1, the monitor circuit 23 transfers the program to the emulation memory 24 at step ST1.

After the program of the microcomputer 3 to be debugged has been stored in the emulation memory 24, the monitor circuit 23 controls the microcomputer 3 in accordance with commands transmitted from the host computer 1. Thus, the microcomputer 3 starts executing the program to be debugged stored in the emulation memory 24 at step ST2.

More specifically, since the program linked with the real time OS is complex consisting of multiple tasks (a set of modules called tasks managed module by module), the individual tasks are executed according to a schedule planned by the scheduler of the real time OS.

Thus, the scheduler of the real time OS sequentially determines the task to be executed next. The scheduler of the real time OS changes the content of an identification number storing area, which is reserved in a system management area (in the emulation memory 24) controlled by the real time OS for storing the identification number of the task to be executed next, to the identification number of the task to be executed next, thereby achieving the switching of the execution task.

When changing the content of the identification number storing area in the emulation memory 24 to the identification number of the task to be executed next, the microcomputer 3 outputs the identification number of the task to be executed next onto the data bus 26, and the address in which the identification number of the task is to be stored (the address in the emulation memory 24) onto the address bus 25, and outputs the status signal commanding the write operation onto the bus 27.

Thus, the identification number of the task to be executed next is stored in the emulation memory 24, in which case the write cycle detector 29 detects at step ST3 the write cycle of the microcomputer 3 for recording the task identification number on the basis of the fact that the status signal commanding the write operation is output from the microcomputer 3 to the bus 27, and that the address of the identification number storing area is placed onto the address bus 25.

With the write cycle detected by the write cycle detector 29, the controller 32 has the measurement memory 28 record that fact together with the write cycle (identification number) of the microcomputer 3, and the detection time of the write cycle delivered from the timer 33 by supplying the timer 33 with a control signal at steps ST4 and ST5.

On the other hand, the kernel of the real time OS is started by the occurrence of a software interrupt, and it cannot execute the task while handling the software interrupt. In this case, even if the content of the identification number storing area is changed, the switching of the execution task does not actually occur at that instant, but is delayed until the software interrupt has been completed.

Therefore, to recognize the switching time of the execution task, it is necessary to detect the start cycle and end cycle of the software interrupt of the microcomputer 3.

The start cycle of the software interrupt of the microcomputer 3 can be detected by monitoring by the interrupt start cycle detector 30, the status signal indicating the start of the interrupt, which is usually output onto the bus 27 when the microcomputer 3 starts the interrupt processing. When the microcomputer 3 does not output the status signal indicating interrupt processing, however, the start cycle is detected by the operation of a particular bus during interrupt processing of the microcomputer 3, or the like.

On the other hand, the end cycle of the software interrupt of the microcomputer 3 can be detected by monitoring the content of the data bus 26 by the interrupt end cycle detector 31 because the microcomputer 3 executes a specific command (such as a return command from the interrupt) for returning from the interrupt processing when it completes the interrupt processing.

With the interrupt start cycle detector 30 detecting the start cycle of the interrupt processing and the interrupt end cycle detector 31 detecting the end cycle of the interrupt processing, the controller 32 has the measurement memory 28 store the start and end cycles of the interrupt processing together with the start cycle or the end cycle of the microcomputer 3, and has the timer 33 store the detection time of the start cycle or the end cycle of the interrupt processing at steps ST6–ST9 in the measurement memory 28.

Figure 3:
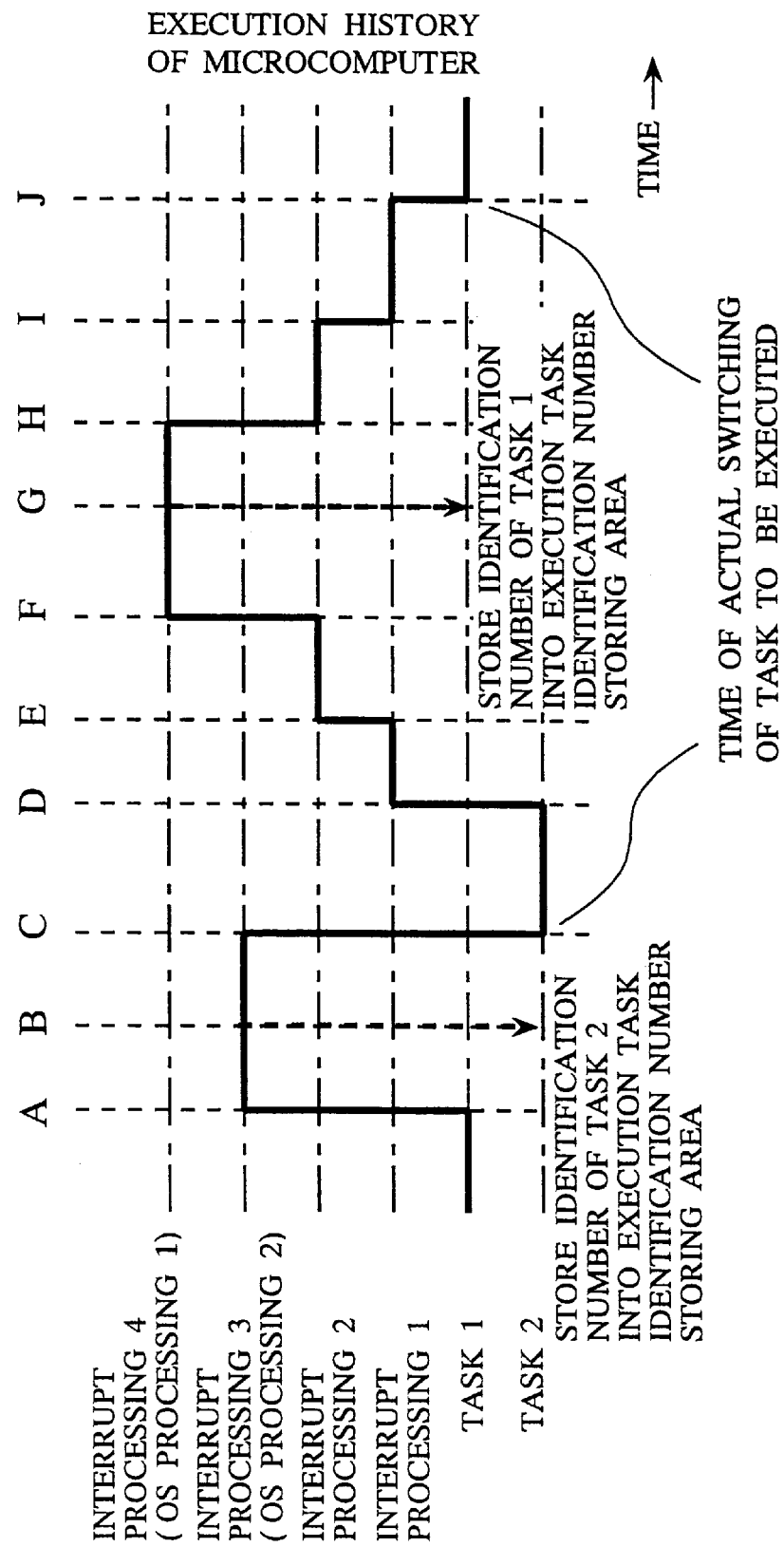
FIG. 3 is timing chart illustrating task execution states.

This makes it possible for program developers to recognize the history of the execution of the tasks by referring to the contents recorded in the measurement memory 28 after executing the program to be debugged. For example, in the processing as shown in FIG. 3, although the identification number of a task 2 was stored in the identification number storing area at time B as the task to be executed next, it was not until time C that the task 2 was actually executed.

Likewise, although the identification number of task 1 was stored in the identification number storing area at time G as the task to be executed next, it was not until time J at which all the interrupts had been completed that the task 1 was actually executed because the interrupts occurred in nesting from time D to time J.

As described above, according to embodiment 1, since the detection time of the write cycle of the microcomputer 3 for recording the identification number, and the detection time of the start cycle or end cycle of the interrupt processing are stored in the measurement memory 28 when they are detected, the history of executing the tasks can be recognized without incorporating the specific task for storing the identification number or the switching time of the task to be executed next in the measurement memory 28 into the program to be debugged. As a result, that the program actually loaded on the microcomputer 3 agrees with the program to be debugged.

In addition, since the history of the task execution can be recognized without mounting a dedicated timer for debugging on the microcomputer 3, an advantage can be achieved of preventing inclusion of a resource which will become useless after the debugging from being added to the system.

EMBODIMENT 2

Figure 4:
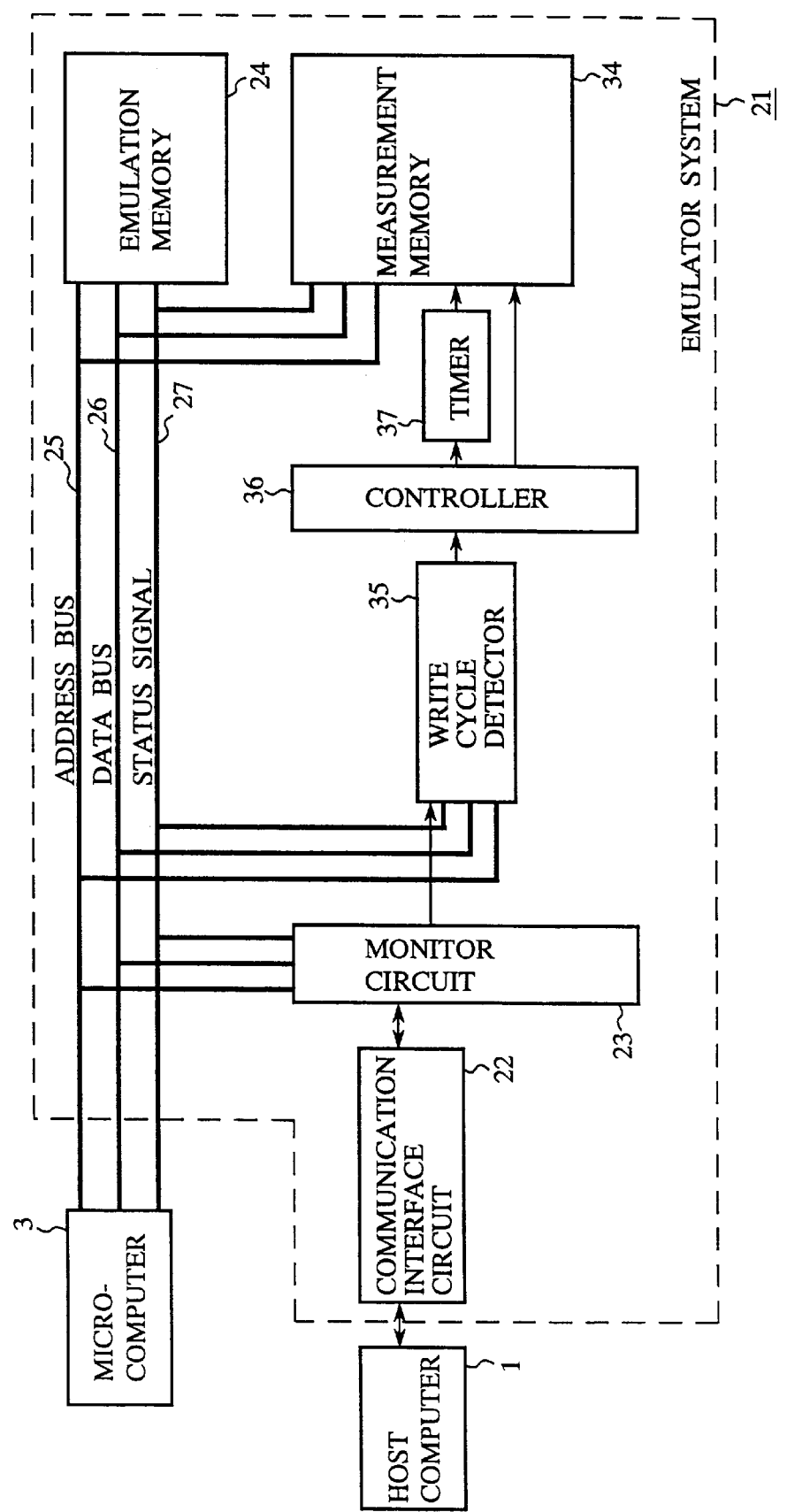
FIG. 4 is a block diagram showing embodiment 2 of the emulator system in accordance with the present invention.

FIG. 4 is a block diagram showing embodiment 2 of the emulator system in accordance with the present invention, in which the same reference numerals designate the same or like portions as those of FIG. 1, and hence the description thereof is omitted here.

The reference numeral 34 designates a measurement memory (recording means) for recording the status signal indicating the state of a task when it is written into the emulation memory 24 by the microcomputer 3 via the data bus 26 involved in state transition tasks; 35 designates a write cycle detector (write detection means) for detecting, by monitoring the state of the microcomputer 3, the write cycle of the microcomputer 3, in which the status signal of the task is recorded into the emulation memory 24; 36 designates a controller (event management means) for having the measurement memory 34 record the write cycle of the microcomputer 3 and the fact of detecting it when it is detected by the write cycle detector 35; and 37 designates a timer (event management means) for having the measurement memory 34 record the detection time of the write cycle detector 35.

Figure 5:
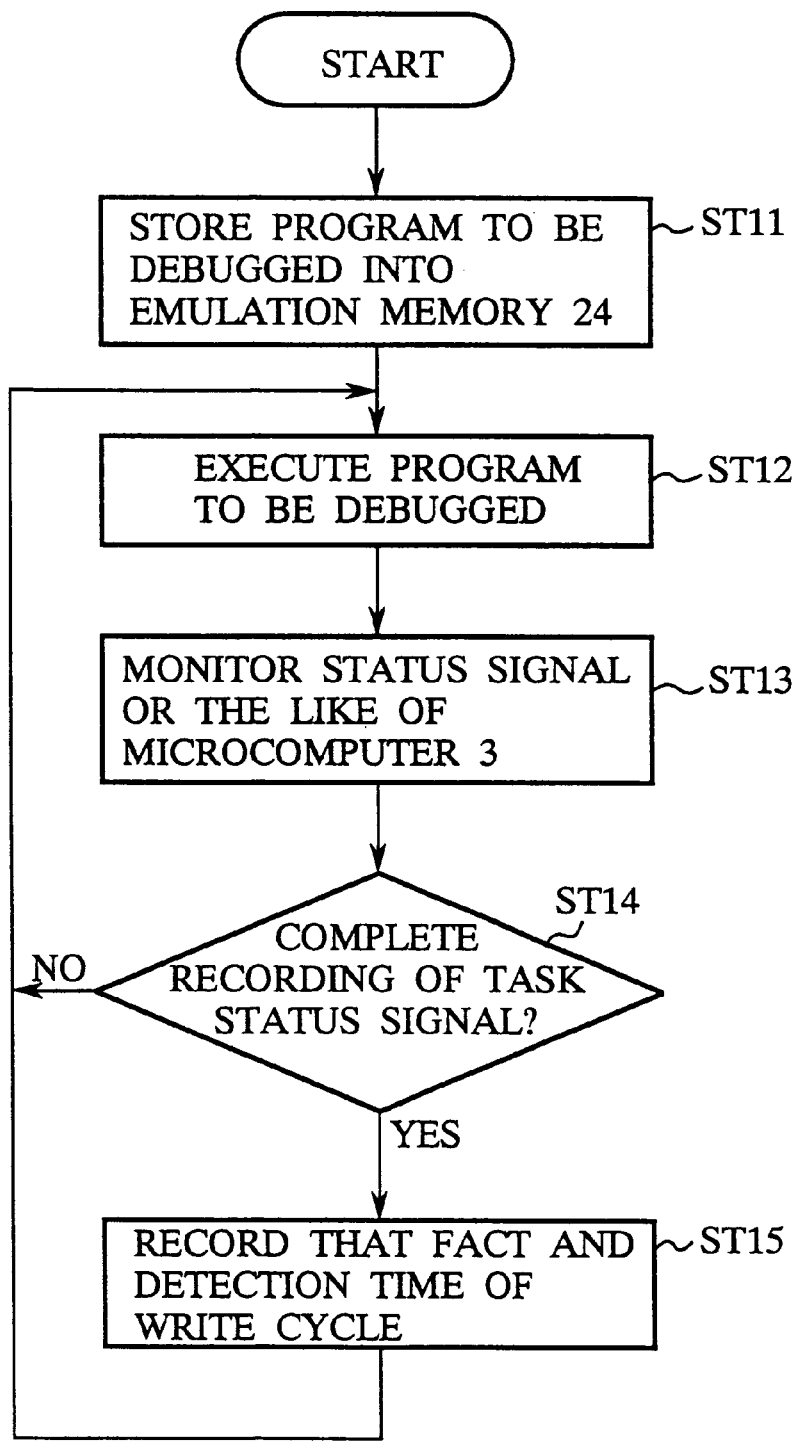
FIG. 5 is a flowchart illustrating an emulation method applied to embodiment 2 of the emulator system in accordance with the present invention.

FIG. 5 is a flowchart illustrating an emulation method applied to the embodiment 2 of the emulator system in accordance with the present invention.

Next, the operation will be described.

First, when debugging a program of the microcomputer 3 mounted on target board 2 (see, FIG. 8), a debugger (program for supporting debugging) is started in the host computer 1.

When the debugger has been started, the host computer 1 transmits the program (program linked with a real time OS) of the microcomputer 3 to be debugged to the monitor circuit 23 via the communication interface circuit 22.

Receiving the program of the microcomputer 3 to be debugged from the host computer 1, the monitor circuit 23 transfers the program to be debugged to the emulation memory 24 at step ST11.

After the program of the microcomputer 3 to be debugged has been stored in the emulation memory 24, the monitor circuit 23 controls the microcomputer 3 in accordance with commands transmitted from the host computer 1. Then, the microcomputer 3 starts executing the program to be debugged stored in the emulation memory 24 at step ST12.

More specifically, since the program linked with the real time OS is complex and consists of multiple tasks (a set of modules called tasks managed module by module), the individual tasks are executed according to a schedule planned by the scheduler of the real time OS.

Thus, the scheduler of the real time OS sequentially determines the task to be executed next. In this case, it will be very profitable in carrying out the debugging of the program if the history of the state transition of the tasks can be recognized because the tasks have, besides the execution state and suspended state (sleep state), a waiting state (ready state) ready to be executed.

In view of this, the present embodiment 2 records the state transition history of the tasks as follows.

First, the scheduler of the real time OS changes the content of a task state storing area, an area reserved in the system management area managed by the real time OS for storing the status signal indicating the state of the task, into a status signal indicating the state after the state transition of the task.

With the content of the task state storing area having been changed to that after the transition, the microcomputer 3 outputs the status signal of the task associated with the transition to the data bus 26 and the address in which the status signal of the task is to be stored (address in the emulation memory 24) to the address bus 25, and outputs the status signal commanding the write operation to the bus 27.

Thus, the status signal of the task having undergone the state transition is stored in the emulation memory 24. The write cycle detector 35 detects the write cycle of the microcomputer 3 for recording the status signal of the task on the basis of the fact that the status signal commanding the write operation is output from the microcomputer 3 to the bus 27, and that the address of the task state storing area is placed onto the address bus 25. (ST13)

With the write cycle having been detected by the write cycle detector 35, the controller 36 has the measurement memory 34 record that fact together with the write cycle (identification number) of the microcomputer 3, and the detection time of the write cycle delivered from the timer 37 by supplying the timer 37 with a control signal at steps ST14 and ST15.

This makes it possible for program developers to recognize the history of the state transition of the tasks by referring to the contents recorded in the measurement memory 34 after executing the program to be debugged.

As described above, according to embodiment 2, when the write cycle of the microcomputer 3 has been detected, in which the status signal of each task is recorded, its detection time is recorded in the measurement memory 34. This makes it possible to identify the history of the state transition of the tasks without incorporating the specific task for storing the status signal of the tasks or their state transition times in the measurement memory 34 into the program to be debugged. As a result, the debugging efficiency of the program is improved.

EMBODIMENT 3

Figure 6:
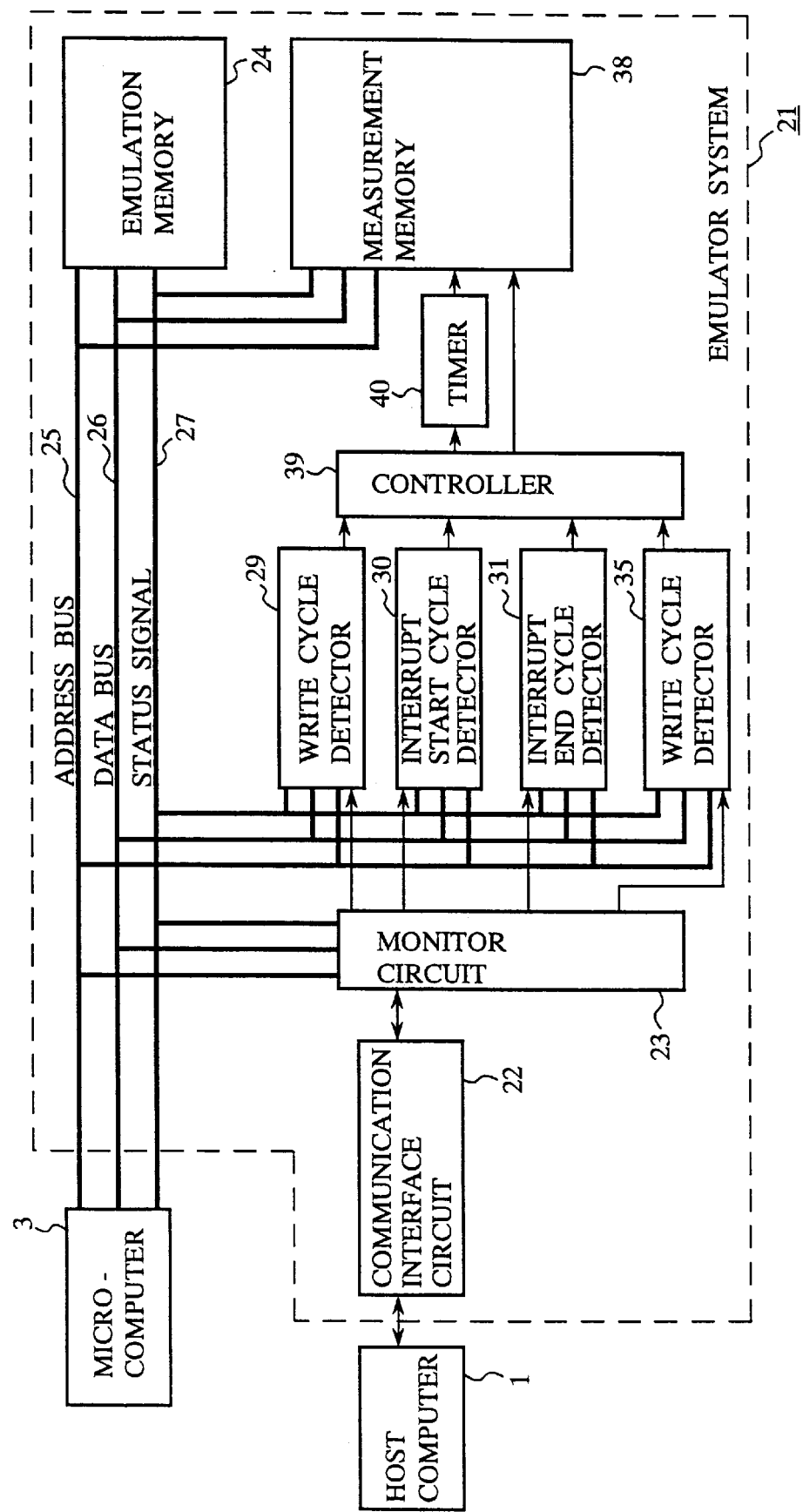
FIG. 6 is a block diagram showing embodiment 3 of the emulator system in accordance with the present invention.

FIG. 6 is a block diagram showing embodiment 3 of the emulator system in accordance with the present invention, in which the same reference numerals designate the same or like portions as those of FIGS. 1 and 4, and hence the description thereof is omitted here.

The reference numeral 38 designates a measurement memory (recording means) for recording not only an identification number of a task to be executed next when the identification number is written into the emulation memory 24 by the microcomputer 3 via the data bus 26 involved in switching an execution task, but also the status signal indicating the state of a task when the signal is output from the microcomputer 3 to the data bus 26 involved in the state transition of the task; 39 designates a controller (event management means) for having the measurement memory 38 record the write cycle and the like of the microcomputer 3 and the fact that the write cycle are detected by the write cycle detector 29, the interrupt start cycle detector 30 the, interrupt end cycle detector 31 and the write cycle detector 35; and 40 designates a timer (event management means) for having the measurement memory 38 record the detection times of the detectors 29–31 and 35.

Next, the operation will be described.

Although the emulator system comprising the function of recording the history of the task execution and interrupt processing is described in the foregoing embodiment 1, and the emulator system comprising the function of recording the history of the task state transition in the foregoing embodiment 2, the present embodiment 3 of the emulator system comprises both of these functions as shown in FIG. 6.

Specifically, the emulator system, which comprises the write cycle detector 29, interrupt start cycle detector 30, interrupt end cycle detector 31 and write cycle detector 35, can record the history of the task execution and interrupt processing as well as the history of the task state transition.

With such an arrangement, the emulator system can also recognize the wait time from entering the executable state to the actual execution of the task.

EMBODIMENT 4

Figure 7:
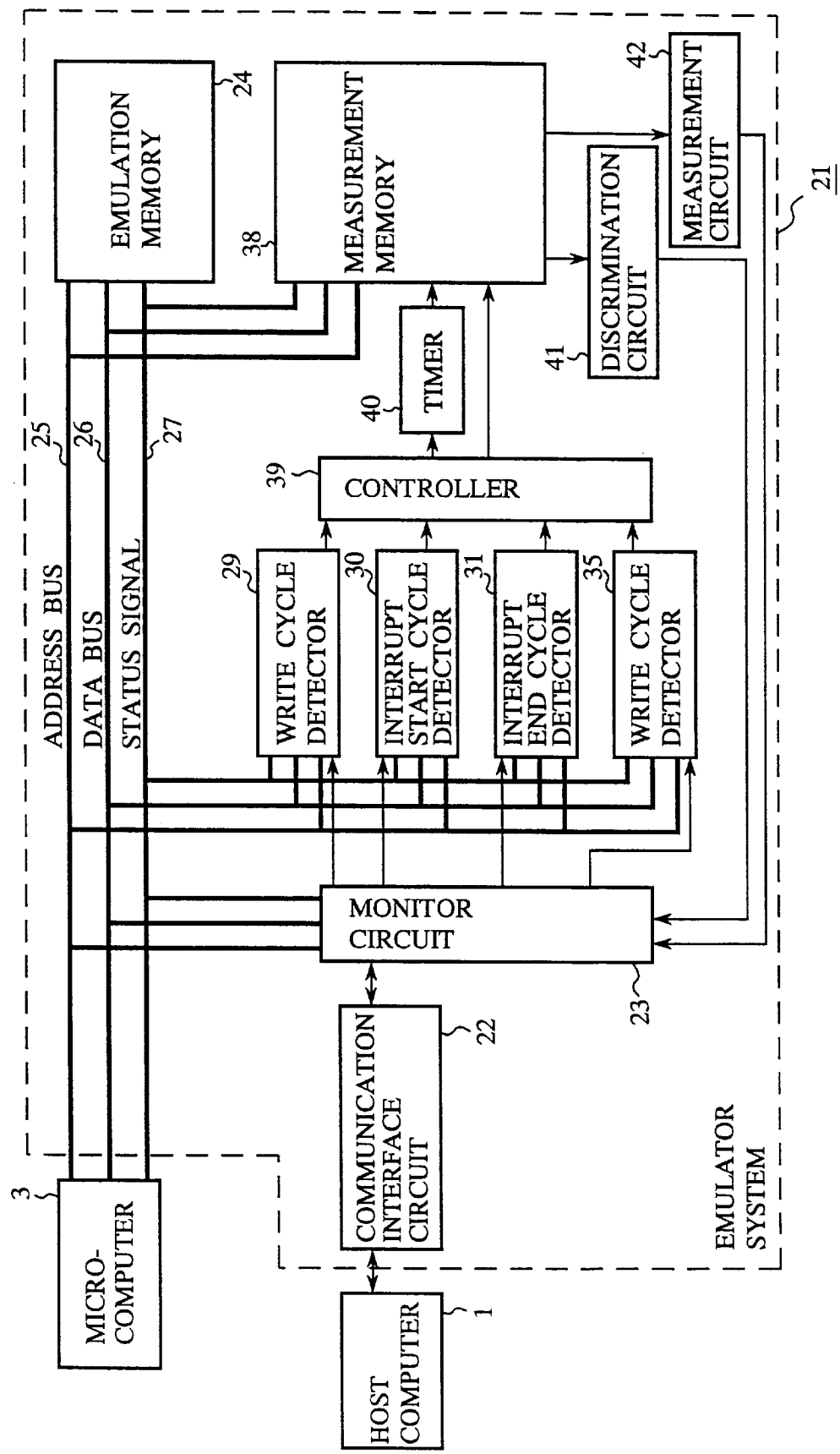
FIG. 7 is a block diagram showing embodiment 4 of the emulator system in accordance with the present invention.

In the foregoing embodiments 1–3, the program developers recognize the history of the task execution and the like by referring to the recorded contents in the measurement memory 28, 34 or 38 (referred to as measurement memory 38 below) after the program to be debugged has been executed. This, however, is not essential. For example, as shown in FIG. 7, it may be possible to provide a discrimination circuit 41 (discriminating means) for distinguishing the task execution history, interrupt processing history and task state transition history on the basis of the contents recorded in the measurement memory 38; or a measurement circuit 42 (measuring means) for measuring the wait time from the transition into the executable state to the actual execution of the task.

The discrimination circuit 41 decides not only the task execution history from the task identification numbers and the detection timings (including those of the start cycles and end cycles of the interrupt processing) of the write cycles of the microcomputer 3, which have been recorded in the measurement memory 38, but also the task state transition history from the task status signal and the detection timings of the write cycles of the microcomputer 3, which have been recorded in the measurement memory 28, and transmits the decision results to the host computer 1 through the monitor circuit 23 and communication interface circuit 22.

On the other hand, the measurement circuit 42 measures the wait time of the task from the transition into executable state to the actual execution on the basis of the status signal of the task and the detection timings of the write cycles of the microcomputer 3 recorded in the measurement memory 38, and transmits the measurement results to the host computer 1 through the monitor circuit 23 and communication interface circuit 22.

This offers an advantage of enabling the program developers to recognize the task execution history and the task state transition history without analyzing the contents recorded in the measurement memory 38.

What is claimed is:

1. An emulator system for debugging a program to be executed by a microcomputer, said emulator system comprising:

an emulation memory;

recording means for recording task related information concerning a task to be executed by a microcomputer when the task related information is written into said emulation memory by the microcomputer;

write detection means for detecting a write cycle of the microcomputer during which the task related information is recorded in said emulation memory by monitoring a state of the microcomputer; and event management means for controlling said recording means to record in said recording means a detection time at which the write cycle is detected by said write detection means.

2. The emulator system as claimed in claim 1, wherein the task related information is a status signal indicating a state of the task, the status signal being output from the microcomputer in a state transition of the task.

3. The emulator system as claimed in claim 1, wherein the task related information is an identification number of a task to be executed next by the microcomputer, the identification number being output from the microcomputer in switching of a task to be executed by the microcomputer.

4. The emulator system as claimed in claim 3, comprising interrupt detection means for detecting a start cycle and an end cycle of interrupt processing by the microcomputer, by monitoring the state of the microcomputer, wherein said event management means controls said recording means to record in said recording means a detection time at which the start cycle and the end cycle of interrupt processing is detected by said interrupt detection means.

5. The emulator system as claimed in claim 4, wherein said task related information includes a status signal indicating a state of the task, the status signal being output from the microcomputer in a state transition of the task.

6. The emulator system as claimed in claim 4, comprising discrimination means for determining a history of task execution and a history of interrupt processing by referring to contents recorded in said recording means.

7. The emulator system as claimed in claim 5, comprising discrimination means for determining a history of task execution and a history of interrupt processing by referring to contents recorded in said recording means.

8. The emulator system as claimed in claim 2, comprising discriminating means for determining a history of task state transition by referring to contents recorded in said recording means.

9. The emulator system as claimed in claim 5, comprising discriminating means for determining a history of task state transition by referring to contents recorded in said recording means.

10. The emulator system as claimed in claim 5, comprising measurement means for measuring a wait time of a task from transition to an executable state until actual execution by referring to contents recorded in said recording means.

11. An emulation method for debugging a program to be executed by a microcomputer, the emulation method comprising:

recording, in an emulation memory, task related information concerning a task to be executed by a microcomputer, the task related information being output from the microcomputer;

detecting a write cycle of the microcomputer during which the task related information is recorded in the emulation memory by monitoring a state of the microcomputer; and recording in a recording memory a detection time at which the write cycle of the microcomputer is detected.

12. The emulation method as claimed in claim 11, wherein the task related information is a status signal indicating a state of the task, the status signal being output from the microcomputer in a state transition of the task.

13. The emulation method as claimed in claim 11, wherein the task related information is an identification number of a task to be executed next, the identification number being output from the microcomputer in switching of a task to be executed.

14. The emulation method as claimed in claim 13, comprising:

detecting a start cycle and an end cycle of interrupt processing of the microcomputer by monitoring a state of the microcomputer; and recording, in the recording memory, times of detecting the start cycle and the end cycle of the interrupt processing.

15. The emulation method as claimed in claim 14, wherein the task related information includes a status signal indicating a state of the task, the status signal being output from the microcomputer in the state transition of the task.

16. The emulation method as claimed in claim 14, comprising determining a history of task execution and a history of interrupt processing by referring to identification numbers of tasks, times of detecting write cycles, and start cycles and end cycles of interrupts, which have been recorded in the recording memory.

17. The emulation method as claimed in claim 15, comprising determining a history of task execution and a history of interrupt processing by referring to identification numbers of tasks, times of detecting write cycles, and start cycles and end cycles of interrupts, which have been recorded in the recording memory.

18. The emulation method as claimed in claim 12, comprising determining a history of task state transition by referring to recorded status signals of tasks and times of detecting write cycles which have been recorded in the recording memory.

19. The emulation method as claimed in claim 15, comprising determining a history of task state transition by referring to recorded status signals of tasks and times of detecting write cycles which have been recorded in the recording memory.

20. The emulation method as claimed in claim 15, comprising measuring a wait time of a task from its transition to an executable state until actual execution by referring to recorded status signals of tasks and times of detecting write cycles which have been recorded in the recording memory.

* * * * *